US008576826B2

(12) United States Patent
Zhu et al.

(10) Patent No.: US 8,576,826 B2
(45) Date of Patent: Nov. 5, 2013

(54) MOBILE WIRELESS COMMUNICATIONS DEVICE HAVING A SINGLE BLUETOOTH / WIRELESS LOCAL AREA NETWORK ANTENNA AND ASSOCIATED METHODS

(75) Inventors: Lizhong Zhu, Waterloo (CA); Koon Hung Lee, Mississauga (CA); Jun Xu, Waterloo (CA); Libo Zhu, Waterloo (CA); Fei He, Waterloo (CA); Craig Stuart Mackenzie, Guelph (CA); Michael Stephen Corrigan, Waterloo (CA); George Soliman Mankaruse, Kitchener (CA); Perry Jarmuszewski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 183 days.

(21) Appl. No.: 13/116,321

(22) Filed: May 26, 2011

(65) Prior Publication Data

US 2012/0106525 A1    May 3, 2012

Related U.S. Application Data

(60) Provisional application No. 61/408,345, filed on Oct. 29, 2010.

(51) Int. Cl.
*H04J 1/00* (2006.01)
(52) U.S. Cl.
USPC ........................................................ 370/343

(58) Field of Classification Search
None
See application file for complete search history.

(56) References Cited

U.S. PATENT DOCUMENTS

| 5,185,762 | A  | * | 2/1993  | Schilling ....................... 370/342 |
| 6,643,522 | B1 |   | 11/2003 | Young ......................... 455/552.1 |
| 8,331,289 | B1 | * | 12/2012 | Lee et al. ....................... 370/328 |
| 2007/0060055 | A1 | * | 3/2007 | Desai et al. ................... 455/41.2 |
| 2009/0239471 | A1 |   | 9/2009 | Tran et al. ..................... 455/41.2 |
| 2009/0285135 | A1 | * | 11/2009 | Rousu et al. ................... 370/297 |

OTHER PUBLICATIONS

Texas Instruments, "Wireless performance optimization solutions: Bluetooth and 802.11 coexistence" 2003, pp. 1-4.

* cited by examiner

*Primary Examiner* — Yong Zhou
(74) *Attorney, Agent, or Firm* — Allen, Dyer, Doppelt, Milbrath & Gilchrist, P.A.

(57) ABSTRACT

A mobile wireless communications device includes a wireless local area network (WLAN) radio configured to generate a WLAN transmit signal, and a Bluetooth radio configured to generate a Bluetooth transmit signal. A circulator is coupled downstream of an antenna. A transmit path couples the WLAN radio and the Bluetooth radio to the circulator such that the WLAN radio and the Bluetooth radio are capable of transmitting simultaneously. In addition, a receive path also couples the WLAN radio and the Bluetooth radio to the circulator such that the WLAN radio and the Bluetooth radio are capable of receiving simultaneously.

18 Claims, 5 Drawing Sheets

MOBILE WIRELESS COMMUNICATIONS DEVICE HAVING A SINGLE BLUETOOTH / WIRELESS LOCAL AREA NETWORK ANTENNA AND ASSOCIATED METHODS

RELATED APPLICATION

This application is based upon prior filed copending provisional application Ser. No. 61/408,345 filed Oct. 29, 2010, the entire subject matter of which is incorporated herein by reference in its entirety.

TECHNICAL FIELD

The present disclosure relates to the field of communications, and, more particularly, to the field of mobile wireless communications devices.

BACKGROUND

Mobile wireless communications devices today are used for more than voice communications. Indeed, many mobile wireless communications devices today are capable of sending and receiving e-mail, browsing the Internet, executing a variety of applications, and playing media files. Indeed, given the ever increasing features present in mobile wireless communications devices, the delineation between them and traditional desktop computers is becoming less pronounced.

In fact, some mobile wireless communications devices today are capable of wireless communications that are not cellular in nature, such as wireless local area network (WLAN) communications and Bluetooth™ communications. While these additional capabilities are desired by users, they place additional requirements on the hardware of the mobile wireless communications devices. For example, to handle these additional wireless communications, mobile wireless communications devices typically have additional antennas and additional hardware. These additional antennas and hardware increase the size and weight of the device, as well as add cost the manufacture of the device. As such, new ways of adding non-cellular wireless communications functionality to mobile wireless communications devices are desirable.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device may include an antenna and a circulator coupled to the antenna. A wireless local area network (WLAN) radio may be configured to generate a WLAN transmit signal, and a Bluetooth radio may be configured to generate a Bluetooth transmit signal. In addition, the mobile wireless communications device may include a transmit path coupling the WLAN radio and the Bluetooth radio to the circulator such that the WLAN radio and the Bluetooth radio are capable of transmitting simultaneously. Similarly, the mobile wireless communications device may include a receive path also coupling the WLAN radio and the Bluetooth radio to the circulator such that the WLAN radio and the Bluetooth radio are capable of receiving simultaneously. The use of one antenna to transmit or receive both WLAN and Bluetooth at the same time, as opposed to prior art systems that use two separate antennae, advantageously saves space, weight, and cost.

In some applications, the transmit path may comprise a transmit power combiner configured to combine the WLAN transmit signal and the Bluetooth transmit signal into a combined transmit signal. In addition, the transmit path may further comprise a notch filter coupled downstream from the power transmit power combiner, and a power amplifier coupled downstream from the notch filter.

Further, the transmit path may comprise a bandpass filter coupled between the power amplifier and the circulator. Moreover, the transmit path may also include a bandpass filter coupled between the antenna and the circulator. A bandpass filter may be coupled to the circulator. An amplifier may be coupled between the Bluetooth radio and the bandpass filter.

The receive path may comprise a bandpass filter coupled downstream from the circulator, and a low noise amplifier downstream of the bandpass filter. The receive path may further comprise a receive power splitter downstream of the bandpass filter configured to separate the combined receive signal into a receive WLAN signal and a receive Bluetooth signal.

The circulator may be configured to couple the transmit path to the antenna and couple the receive path to the antenna while at least partially isolating the transmit path from the receive path.

A method aspect is directed to a method of making a mobile wireless communications device that may comprise coupling a circulator downstream of an antenna. The method may also include coupling a WLAN radio and a Bluetooth radio to the circulator via a transmit path such that the WLAN radio and the Bluetooth radio are capable of transmitting simultaneously. The method may further include coupling the WLAN radio and the Bluetooth radio to the circulator via a receive path such that the WLAN radio and the Bluetooth radio are capable of receiving simultaneously.

Figure 1:
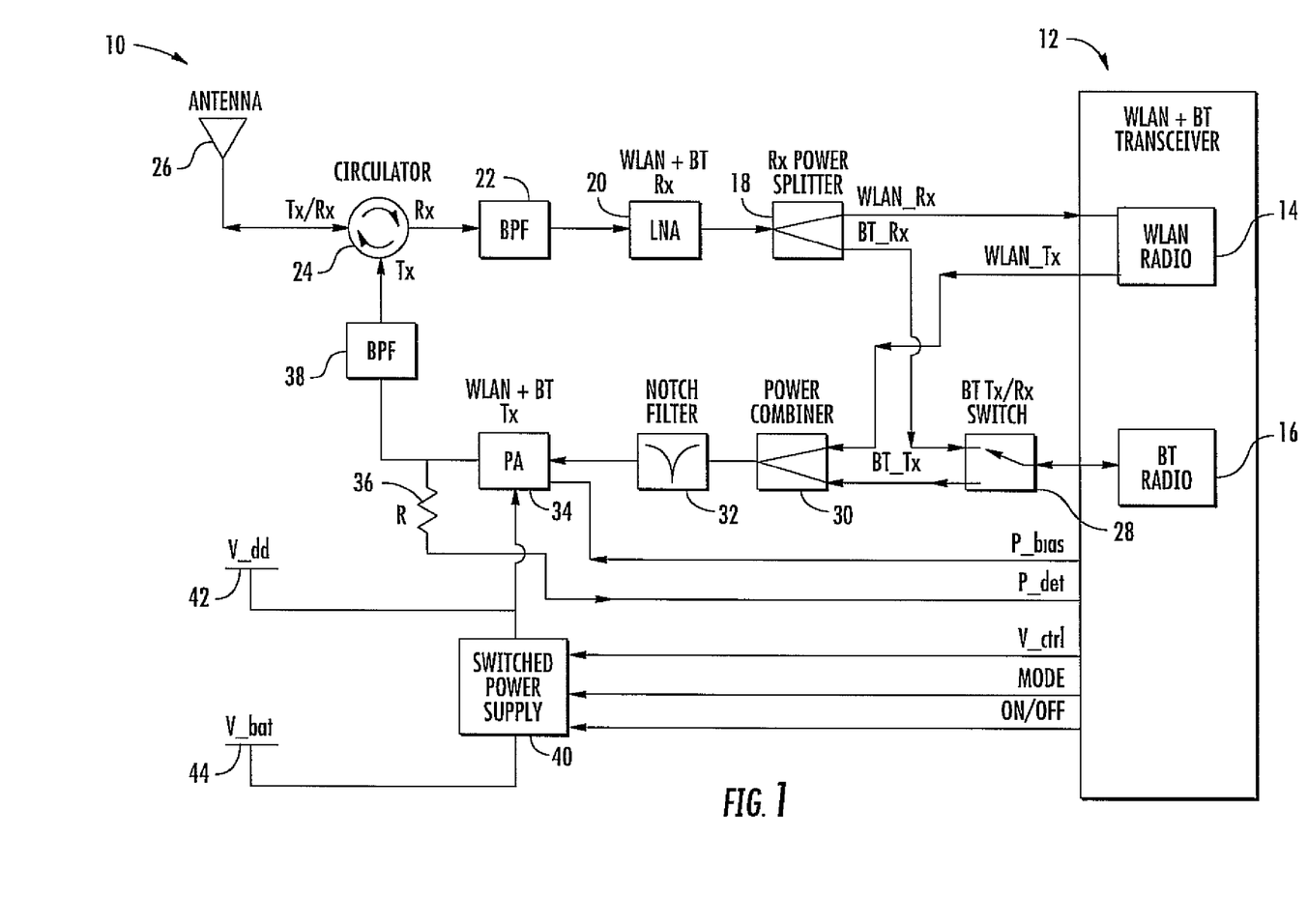
FIG. 1 is a schematic block diagram of a mobile wireless communications device of the present disclosure.

With reference to FIG. 1, a mobile wireless communications device 10 is now described. The mobile wireless communications device 10 has a dual band transceiver 12 that includes both a wireless local area network (WLAN radio 14 and a Bluetooth™ radio 16. The dual band transceiver 12 may be an integrated circuit, for example, made by Broadcomm or Texas Instruments. Of course, it should be appreciated that other integrated circuits from other manufacturers may be used.

The mobile wireless communications device 10 includes a transmit path and a receive path. The transmit path includes both the WLAN radio 14 and the Bluetooth™ radio 16. A transmit/receive switch 28 is coupled to the output of the Bluetooth™ radio 16 and receives a Bluetooth™ transmit signal therefrom. It should be appreciated that during Bluetooth™ transmission, the transmit/receive switch 28 is set to transmit, and during Bluetooth™ receipt, the transmit/receive switch 28 is set to receive.

The output of the transmit/receive switch 28 is in turn coupled to a power combiner 30. The output of the WLAN radio 14 is also coupled to the power combiner, and sends a WLAN transmit signal thereto. The power combiner 30 combines the WLAN and Bluetooth™ transmit signals, advantageously allowing simultaneous transmission of both signals. The power combiner 30 is in turn coupled to a notch filter 32, and sends the combined transmit signal (WLAN+Bluetooth™) thereto. The notch filter 32 reduces out of band white noise introduced to the combined transmit signal by either the WLAN radio 14 or the Bluetooth™ radio 16. The notch filter 32 may filter out frequency components at 2.17 GHz, although it should be appreciated that other filters at other frequencies may also be used.

The output of the notch filter 32 is coupled to a power amplifier 34, which amplifies the combined transmit signal. This advantageously allows the Bluetooth™ signal to be transmitted at a higher output level than it would be if there was a separate, dedicated power amplifier for the Bluetooth™ radio 16. A switched power supply 40 is coupled to the power amplifier 34, as is a line from the transceiver 12 carrying a bias voltage. The bias voltage and the supply voltage can be adjusted via the transceiver 12 and the switched power supply 40, respectively, to thereby allow adjustment of the transmit power and linearity of the power amplifier 34. The transmit power can be further adjusted by coupling the output of the power amplifier 34 to a power detector circuit in the transceiver 12 via a resistor 36. The control over the transmit power and linearity provided by the above arrangement allows control of the power amplifier 34 without excessive DC power consumption.

The amplified combined transmit signal is output by the power amplifier 34 and fed to a bandpass filter 38. The bandpass filter 38 helps to reduce out of band noise, reducing interference with other wireless signals. The insertion loss due to the bandpass filter 38 is relatively low since the bandpass filter mainly functions to reject out of band noise.

The output of the bandpass filter 38 is coupled to a circulator 24, which passes the filtered, amplified, combined transmit signal to the antenna 26, which wirelessly transmits that signal. As will be understood by those skilled in the art, the circulator 24 is a multi-port device which passes a signal received at a given port to the next port in rotation. Therefore, the circulator 24 passes the filtered, amplified, combined transmit signal to the antenna 26 from the bandpass filter 38 to the antenna 26. Circulators 24 such as that employed in this disclosure provide excellent reverse isolation (as much as 15 dB in some applications), therefore mitigating load pulling effects on the power amplifier 34 due to an antenna mismatch.

The antenna 26 therefore simultaneously transmits both the WLAN signal and the Bluetooth™ signal. The use of one antenna to accomplish these transmissions, as opposed to prior art systems that use two separate antennae, saves space, weight, and cost. In addition, the mobile wireless communications device 10 has particularly good Bluetooth™ performance compared to conventional designs, as Bluetooth™ antennas in prior art devices are typically compromised in favor of a more effective WLAN antenna, by 2-3 dB in some situations.

Still referring to FIG. 1, the receive path is now described. The receive path includes the antenna 26, which is in turn coupled to the circulator 24, which is in turn coupled to a bandpass filter 22. The circulator 24 passes a received combined signal from the antenna 26 to the bandpass filter 22. It should be appreciated that the circulator 24 helps maintain good isolation between the transmit and receive paths, for example up to and even exceeding 10 dB in some applications.

The bandpass filter 22, after filtering out of band noise, passes the received combined signal to a low noise amplifier 20, which in turn passes an amplified received combined signal to a power splitter 18. The power splitter splits the received WLAN signal from the received Bluetooth™ signal, sends the received WLAN signal to the WLAN radio 14, and sends the received Bluetooth™ signal to the Bluetooth™ radio 16. When the power splitter splits the signals 18, it can split them at an equal ratio or an un-equal ratio, depending upon the application.

This mobile wireless communications device 10 saves antenna space by using one antenna 26, as discussed above. It also has better receiver sensitivity for both the WLAN radio 14 and the Bluetooth™ 16 radio due to the use of separate bandpass filters 22, 38 for the receive path and the transmit path. The use of separate receive path and transmit path bandpass filters 22, 38 allows the tuning of those filters to the paths, as opposed to a general purpose bandpass filter that would be used if the receive path and transmit path shared filters.

Figure 2:
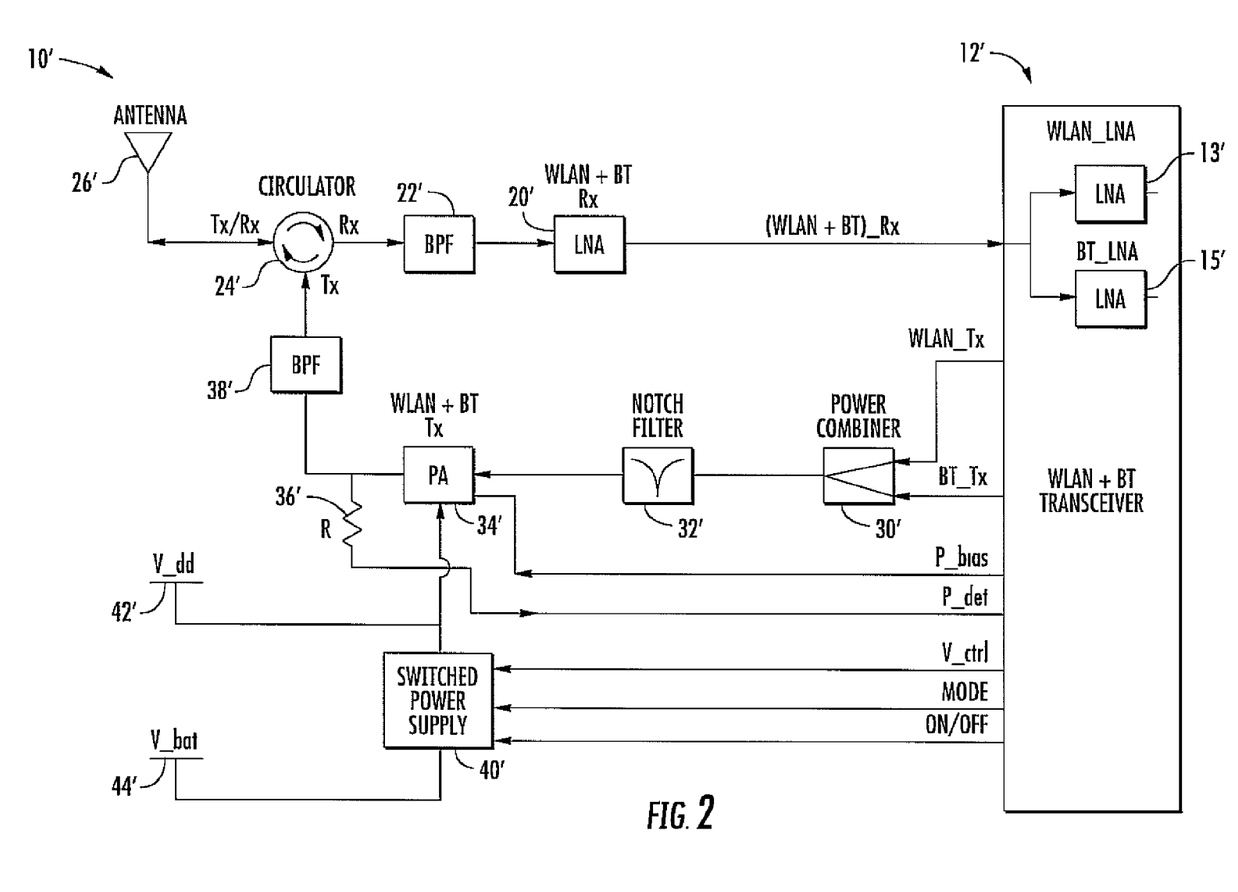
FIG. 2 is a schematic block diagram of another embodiment of the mobile wireless communications device of the present disclosure.

With reference to FIG. 2, a further embodiment of the mobile wireless communications device 10' is now described. In this embodiment, the transmit path lacks the transmit/receive switch. Rather, the power combiner 30' is directly coupled to the transceiver 12'. In addition, the receive path lacks a power splitter, and the low noise amplifier 20' is directly coupled to the transceiver 12'. The transceiver 12' includes first and second internal low noise amplifiers 13', for the received WLAN signal and the received Bluetooth™ signal, respectively. Elements not specifically described are similar to those in the mobile wireless communications device 10 of FIG. 1 described above and require no further discussion.

Figure 3:
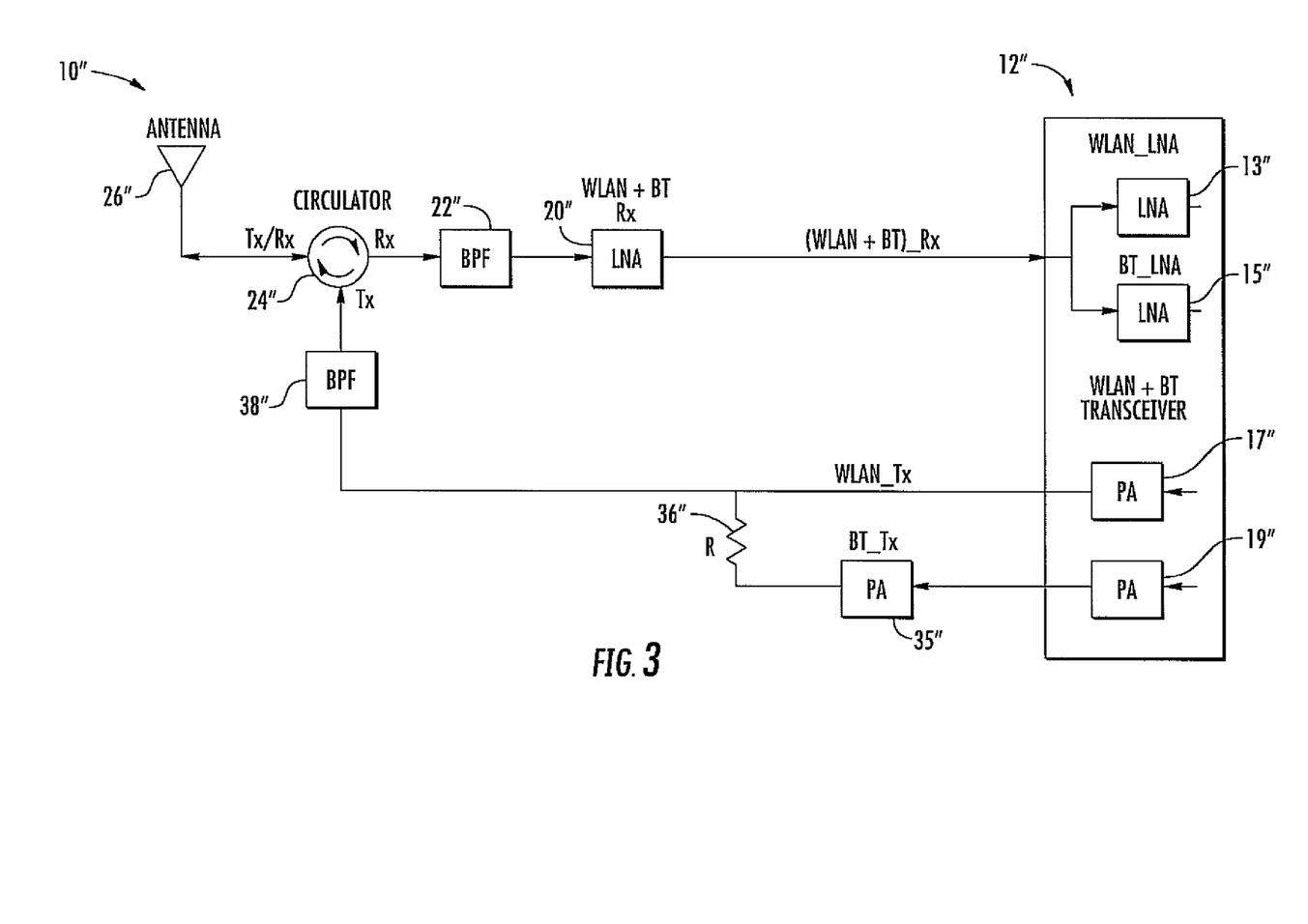
FIG. 3 is a schematic block diagram of a further embodiment of the mobile wireless communications device of the present disclosure.

Yet another embodiment of a mobile wireless communications device 10" is now described with reference to FIG. 3. In this embodiment, the transmit path lacks the switched power supply, the notch filter, and the power combiner, while the transmit path is similar to the transmit path of the mobile wireless communications device 10' of FIG. 2.

The transceiver 12" here includes first and second internal power amplifiers 17", 19" that amplify the transmit WLAN and Bluetooth™ signals, respectively. The first internal power amplifier 17" is directly coupled to the bandpass filter 38". The second internal power amplifier 19" is coupled to a first external power amplifier 35". This first external power amplifier 35" further amplifies the Bluetooth™ transmit signal such that it has a similar power level to the WLAN transmit signal.

The output of the first external power amplifier 35" is coupled to the output of the first internal power amplifier 17" and the input of the bandpass filter 38" via a coupling resistor 36". Elements not specifically described are similar to those in the mobile wireless communications device 10 of FIG. 1 described above and require no further discussion.

Figure 4:
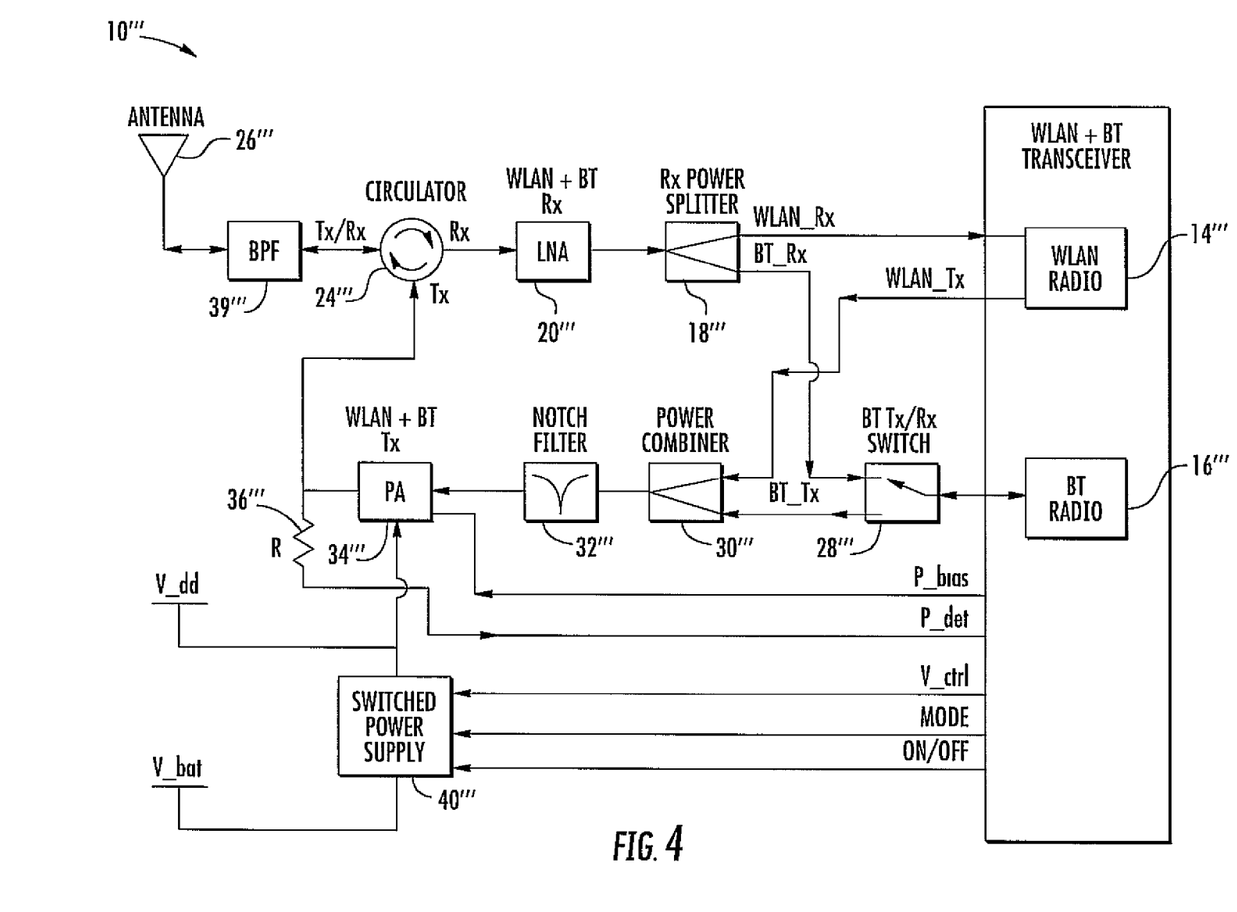
FIG. 4 is a schematic block diagram of yet another embodiment of the mobile wireless communications device of the present disclosure.

It should be appreciated that in some embodiments, the transmit and receive paths may share a single bandpass filter. As shown in FIG. 4, there may be a single bandpass filter 39''', and it may be positioned between the antenna 26''' and the circulator 24'''. Elements not specifically described are similar to those in the mobile wireless communications device 10 of FIG. 1 described above and require no further discussion.

Example components of a mobile wireless communications device 1000 that may be used in accordance with the above-described embodiments are further described below with reference to FIG. 5. The mobile wireless communications device 1000 may function as either the electronic device described above, or the personal information token as described above. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400. Alternatively or additionally, the keypad 1400 may be a "soft" keypad implemented, for example, by providing images of keys on the display 1600.

The housing 1200 may be elongated vertically, or may take on other sizes and shapes (including clamshell housing structures). The keypad may include a mode selection key, or other hardware or software for switching between text entry and telephony entry.

Figure 5:
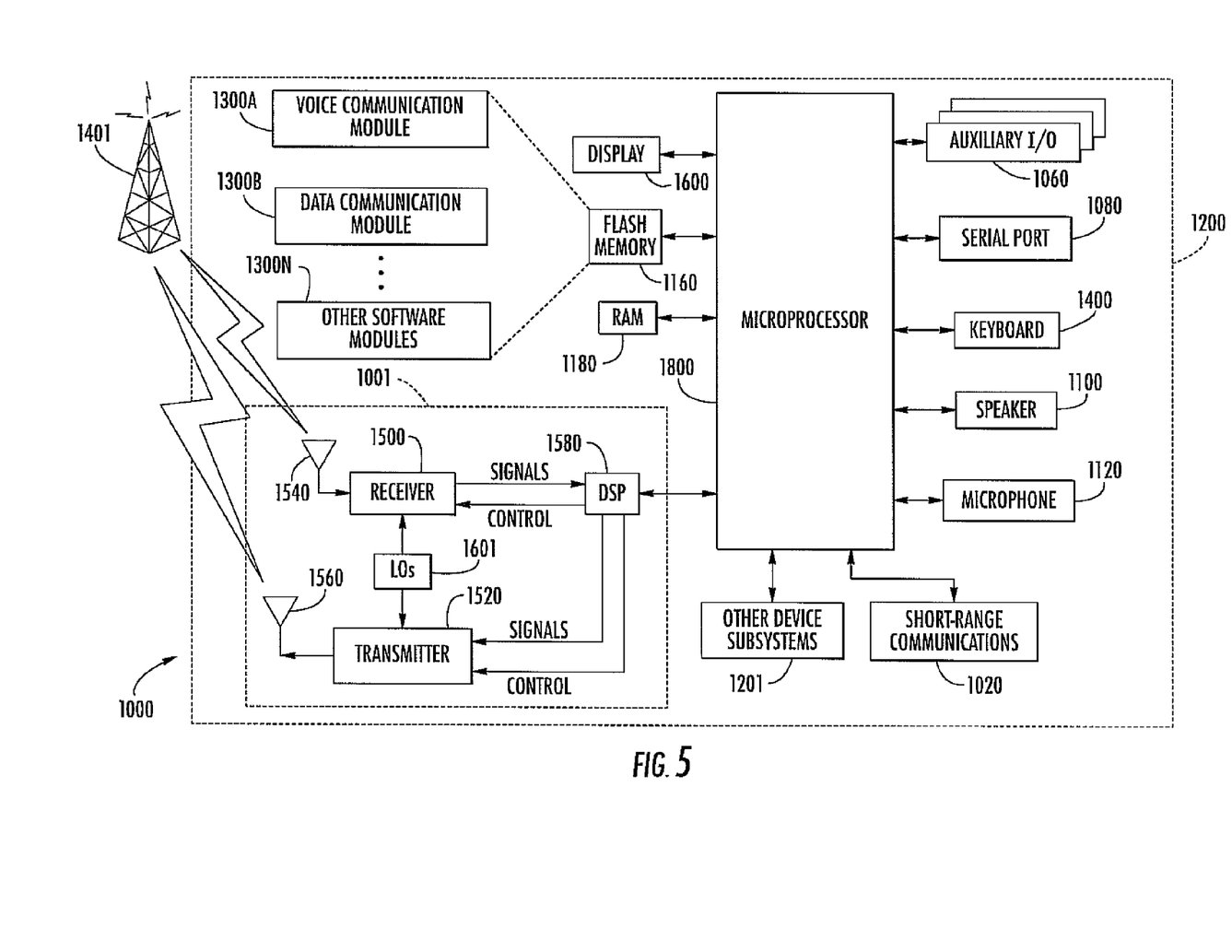
FIG. 5 is a schematic block diagram illustrating example components which may be used in the communications system of FIG. 1, in accordance with an example embodiment.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to, the display 1600, or alternatively to some other auxiliary input/output (I/O) device 1060. A device may also be used to compose data items, such as e-mail messages, using the keypad 1400 and/or some other auxiliary I/O device 1060, such as a trackball, a touchpad, a rocker switch, a thumb-wheel, touch sensitive display or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a wireless local area network (WLAN) radio configured to generate a WLAN transmit signal;
   a Bluetooth radio configured to generate a Bluetooth transmit signal;
   an antenna;
   a circulator coupled downstream of said antenna;
   a transmit path coupling said WLAN radio and said Bluetooth radio to said circulator such that said WLAN radio and said Bluetooth radio are capable of transmitting simultaneously; and
   a receive path also coupling said WLAN radio and said Bluetooth radio to said circulator such that said WLAN radio and said Bluetooth radio are capable of receiving simultaneously;
   wherein the transmit path comprises a transmit power combiner configured to combine the WLAN transmit signal and the Bluetooth transmit signal into a combined transmit signal.

2. The mobile wireless communications device of claim 1, wherein the transmit path further comprises a notch filter coupled downstream from said power transmit power combiner, and a power amplifier coupled downstream from said notch filter.

3. The mobile wireless communications device of claim 2, wherein the transmit path further comprises a bandpass filter coupled between said power amplifier and said circulator.

4. The mobile wireless communications device of claim 2, wherein the transmit path further comprises a bandpass filter coupled between said antenna and said circulator.

5. The mobile wireless communications device of claim 1, wherein the transmit path comprises a bandpass filter coupled to said circulator.

6. The mobile wireless communications device of claim 5, wherein the transmit path further comprises an amplifier coupled between said Bluetooth radio and said bandpass filter.

7. The mobile wireless communications device of claim 1, wherein the receive path comprises a bandpass filter coupled downstream from said circulator, and a low noise amplifier downstream of bandpass filter.

8. The mobile wireless communications device of claim 7, wherein the receive path further comprises a receive power splitter downstream of said bandpass filter configured to separate the combined receive signal into a receive WLAN signal and a receive Bluetooth signal.

9. The mobile wireless communications device of claim 1, wherein said circulator is configured to couple the transmit path to said antenna and couple the receive path to said antenna while at least partially isolating the transmit path from the receive path.

10. A mobile wireless communications device comprising:
    a wireless local area network (WLAN) radio configured to generate a WLAN transmit signal;
    a Bluetooth radio configured to generate a Bluetooth transmit signal;
    an antenna;
    a circulator coupled downstream of said antenna;
    a transmit path coupling said WLAN radio and said Bluetooth radio to said circulator such that said WLAN radio and said Bluetooth radio are capable of transmitting simultaneously, the transmit path comprising transmit power combiner configured to combine the WLAN transmit signal and the Bluetooth transmit signal into a combined transmit signal; and
    a receive path also coupling said WLAN radio and said Bluetooth radio to said circulator such that said WLAN radio and said Bluetooth radio are capable of receiving simultaneously;
    said circulator configured to configured to couple the transmit path to said antenna and couple the receive path to said antenna while at least partially isolating the transmit path from the receive path.

11. The mobile wireless communications device of claim 10, wherein the transmit path further comprises a notch filter coupled downstream from said transmit power combiner, and a power amplifier coupled downstream from said filter.

12. The mobile wireless communications device of claim 11, wherein the transmit path further comprises a bandpass filter coupled between said power amplifier and said circulator.

13. The mobile wireless communications device of claim 11, wherein the transmit path further comprises a bandpass filter coupled between said antenna and said circulator.

14. The mobile wireless communications device of claim 10, wherein the receive path comprises a bandpass filter coupled downstream from said circulator, and a low noise amplifier downstream of bandpass filter.

15. The mobile wireless communications device of claim 14, wherein the receive path further comprises a receive power splitter downstream of said bandpass filter configured to separate the combined receive signal into a receive WLAN signal and a receive Bluetooth signal.

16. A method of making a mobile wireless communications device comprising:
    coupling a circulator downstream of an antenna;
    coupling a WLAN radio and a Bluetooth radio to the circulator via a transmit path such that the WLAN radio and the Bluetooth radio are capable of transmitting simultaneously; and
    coupling the WLAN radio and the Bluetooth radio to the circulator via a receive path such that the WLAN radio and the Bluetooth radio are capable of receiving simultaneously;
    wherein coupling the WLAN radio and the Bluetooth radio to the circulator via a transmit path includes configuring a transmit power combiner to combine the WLAN transmit signal and the Bluetooth transmit signal into a combined transmit signal.

17. The method of claim 16, further comprising configuring the circulator to couple the transmit path to the antenna and to couple the receive path to the antenna while at least partially isolating the transmit path from the receive path.

18. The method of claim 16, wherein coupling the WLAN radio and the Bluetooth radio to the circulator via a transmit path includes coupling a notch filter coupled downstream from the power transmit power combiner, and coupling a power amplifier downstream from the notch filter.

\* \* \* \* \*